F. MAISENBACHER & T. BÜRCK.
PROCESS OF SOLDERING SINGLE LINKS OF SOLID WIRE CHAINS.
APPLICATION FILED OCT. 19, 1911.

1,027,869.

Patented May 28, 1912.

Witnesses:
Carl Meyer
Paul Warner

Inventors:
Fritz Maisenbacher
Theodor Bürck

UNITED STATES PATENT OFFICE.

FRITZ MAISENBACHER AND THEODOR BÜRCK, OF PFORZHEIM, GERMANY.

PROCESS OF SOLDERING SINGLE LINKS OF SOLID WIRE CHAINS.

1,027,869.  Specification of Letters Patent.  Patented May 28, 1912.

Application filed October 19, 1911. Serial No. 655,553.

*To all whom it may concern:*

Be it known that we, FRITZ MAISENBACHER and THEODOR BÜRCK, subjects of the German Emperor, and residents of Pforzheim, Germany, have invented certain new and useful Improvements in Processes of Soldering Single Links of Solid Wire Chains, of which the following is a specification.

For soldering wire chains, generally solder-wire is employed, from which, when heated after the single links are hung into each other, escapes the solder required for soldering the joint. The chain contains, however, in this case more solder than necessary, which makes the solder-wire expensive, and that the more, the thicker and thus the longer are the single links. Attempts to substitute for the solder-wire solid wire and to introduce small pieces of solder into the joint were useless owing to the slowness and nonuniformity of this work, which could only be done by hand, so that the product obtained could not compete with the manufacture of solder-wire chains. And the mechanical manufacture of solid wire-chains was hitherto not possible owing to the difficulty of fixing the solder in the joint of the chain link so as to prevent it from falling out before soldering was effected, which easily occurred especially with thin chains.

The present invention, which is hereinafter described and shown by way of example on the accompanying drawing, overcomes this drawback in that the ends of the chain link to be soldered are not cut off transversely to the length of same, but by a correspondingly designed punch are shaped concavely or otherwise, in such a way that, when bending the wire, to form the chain link, the solder piece, which is introduced from above, is inclosed by and clamped between the wire ends.

Figure 1:
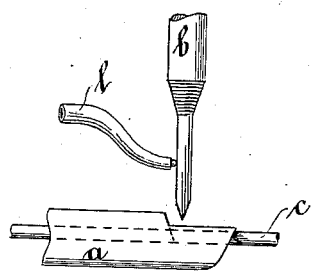
Figure 2:
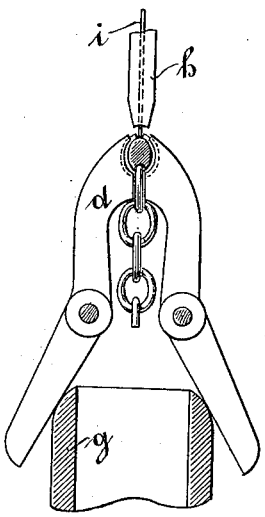
Figure 3:
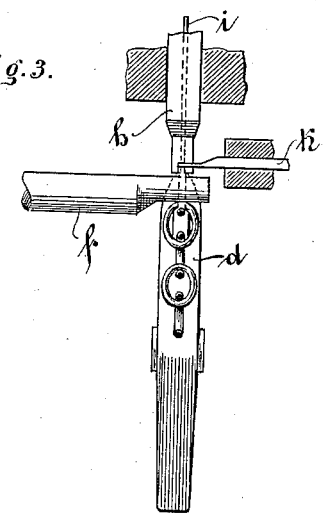
Figure 5:
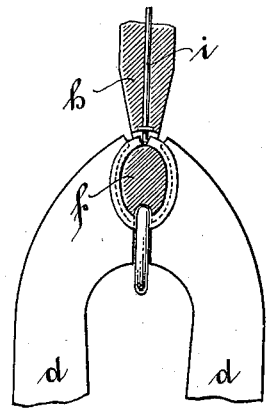
Figure 4:

In the accompanying drawing, Figure 1 is a side view of the cutting-off device for the wire, Fig. 2 a side view of the tongs for forming the wire, with the solder inserted between the wire ends, Fig. 3 a side view of the cutting-off device for the solder, Fig. 4 shows a straight piece of wire with the concavely shaped cut ends, and Fig. 5 a side view of the closed chain link with the cut-off solder clamped between the ends thereof.

The wire $c$ on a grooved bed $a$ is in the known way advanced by reciprocating clamping jaws toward the tongs $d$, when the latter assume their deepest position. The punch $b$ above the bed $a$ is on its end so shaped, that upon its descent, it imparts to the wire ends an uneven shape, for instance that shown in Fig. 4. The pin $f$ holds meanwhile by slight pressure the wire pieces on the grippers of the tongs. After cutting, the tongs ascend and are at the same time closed by upward movement of the shell $g$, which presses against the outer tong members, whereby the chain link is formed around the pin $f$. The joining member $h$ has meanwhile been lowered upon the wire ends, a small distance apart therefrom. By the central boring provided in said member, a thread of solder $i$, which fits the joint of the link, is downwardly advanced to the central lower edges of the joint,—which already touch each other,—but without passing the edges. At the same time, when the solder is advanced into the joint, the latter is closed, whereby the solder is surrounded on three sides by the metal of the ends of the link, which after some pressure, exerted by the tongs and the joining member, clamp the end of the solder. Then the piece of the thread of solder, inclosed in the joint, is cut off by the cutter $k$ just above the joint. After cutting, the member $h$ with advanced cutter $k$ exerts a final pressure on the thread of solder, whereby the latter is pressed down into the joint, while at the same time the upper wire-edges are somewhat bent together above the same. The solder is thus inclosed in the joint on those three sides, which touch the following link, while on the fourth side it is pressed between the upper edges, so that it cannot fall out. The tongs move then downward together with the chain. The latter is further formed in the known way by turning, opening, and so on, of the tongs, and the links provided with solder are soldered directly beneath the shell $g$ after corresponding treatment. Laterally from the punch $b$ a pipe $l$ is arranged, which from a higher located vessel is fed with a solder fluxing agent. In the orifice of said pipe, a piece of felt or other absorbing material is provided, whereby a slow escape of said agent is secured, which, since said felt piece is in contact with the punch $b$, flows down along the same. A cock may be provided in the pipe $l$, to regulate the supply of material. When cutting the wire by the punch $b$, the latter transmits the agent to both sides of the cut wire, so that the later introduced solder is touched from both sides by the same. The cutter $k$ and the guide thereof are preferably so connected with the member $h$, that both move together up and down. After return of cutter $k$, the thread of solder $i$ is again advanced and the process is repeated as above described, and so on.

The cut-off or punched wire-ends can, of course, receive any other shape. For instance, one end may be concave and the other convex, so that, when forming the wire, both ends pass into each other so as to inclose and clamp a correspondingly shaped thread of solder between them. In any case, the shape of the wire ends must be always such as to prevent the solder inserted between them from falling out during the manufacturing process and when undergoing the soldering process to prevent the solder from overflowing on the touching metal of the next link, so that each single link is soldered for itself.

We claim:

In a process of soldering single links of solid wire chains, cutting the two ends of the chain links, which form between them the joint to be soldered, in an uneven way, moistening both ends—while being cut—with a solder fluxing agent, inserting a centrally guided and correspondingly shaped thread of solder between said ends which are closed at their deepest edges and on both sides, then cutting the same off directly above the joint, pressing the cut solder into the joint, so that it is prevented from falling out, joining said wire ends in such a way that they inclose the piece of solder on three sides touching the following link, and finally heating the joint, thus preventing adjacent links from being soldered to each other, substantially as and for the purpose set forth.

In testimony whereof we have hereunto set our hands in the presence of two subscribing witnesses.

F. MAISENBACHER.
TH. BÜRCK.

Witnesses:
 JOSEPH PFEIFFER,
 S. H. SHANK.